United States Patent
Chung et al.

(10) Patent No.: US 11,036,552 B2
(45) Date of Patent: Jun. 15, 2021

(54) COGNITIVE SCHEDULER

(71) Applicant: INTERNATIONAL BUSINESS MACHINES CORPORATION, Armonk, NY (US)

(72) Inventors: I-Hsin Chung, Chappaqua, NY (US); Paul G. Crumley, Yorktown Heights, NY (US); Bhuvana Ramabhadran, Mount Kisco, NY (US); Weichung Wang, Yorktown Heights, NY (US); Huifang Wen, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 250 days.

(21) Appl. No.: 15/334,215

(22) Filed: Oct. 25, 2016

(65) Prior Publication Data
US 2018/0113742 A1 Apr. 26, 2018

(51) Int. Cl.
*G06F 9/50* (2006.01)
*G06F 9/48* (2006.01)
(Continued)

(52) U.S. Cl.
CPC .......... *G06F 9/5005* (2013.01); *G06F 9/4881* (2013.01); *G06N 20/10* (2019.01); *G06N 20/00* (2019.01)

(58) Field of Classification Search
CPC ........ G06F 9/50; G06F 9/5005; G06F 9/5011; G06F 9/5016; G06F 9/5022;
(Continued)

(56) References Cited

U.S. PATENT DOCUMENTS 6,411,601 B1 * 6/2002 Shaffer ................... H04L 43/00
370/230
7,441,241 B2 10/2008 Dawson et al.
(Continued)

FOREIGN PATENT DOCUMENTS

WO 2016082370 A1 6/2016

OTHER PUBLICATIONS

Lama et al., "AROMA: Automated Resource Allocation and Configuration of MapReduce Environment in the Cloud", ICAC'12, Sep. 18, 2012 (Year: 2012).*
(Continued)

*Primary Examiner* — Lewis A Bullock, Jr.
*Assistant Examiner* — Kevin X Lu
(74) *Attorney, Agent, or Firm* — Intelletek Law Group, PLLC; Gabriel Daniel, Esq.

(57) ABSTRACT

A method and an apparatus of allocating available resources in a cluster system with learning models and tuning methods are provided. The learning model may be trained from historic performance data of previously executed jobs and used to project a suggested amount of resources for execution of a job. The tuning process may suggest a configuration for the projected amount of resources in the cluster system for an optimal operating point. An optimization may be performed with respect to a set of objective functions to improve resource utilization and system performance while suggesting the configuration. Through many executions and job characterization, the learning/tuning process for suggesting the configuration for the projected amount of resources may be improved by understanding correlations of historic data and the objective functions.

17 Claims, 7 Drawing Sheets

(51) Int. Cl.
*G06N 20/10* (2019.01)
*G06N 20/00* (2019.01)

(58) Field of Classification Search
CPC .... G06F 9/5027; G06F 9/5044; G06F 9/5061; G06F 9/5072; G06F 9/5077; G06F 9/52; G06F 9/4881; G06N 20/00; G06N 20/10; Y02D 10/22
See application file for complete search history.

(56) References Cited

U.S. PATENT DOCUMENTS

| | | | |
|---|---|---|---|
| 7,596,617 B2* | 9/2009 | Bartley | G06F 11/3476 705/37 |
| 8,261,278 B2* | 9/2012 | Peracha | G06F 11/3409 718/1 |
| 8,631,401 B2* | 1/2014 | Bansal | G06F 9/5011 718/1 |
| 9,015,083 B1* | 4/2015 | Monga | G06F 17/10 706/12 |
| 9,021,490 B2* | 4/2015 | Marchand | G06F 9/4881 718/104 |
| 2007/0143765 A1* | 6/2007 | Aridor | G06F 9/5011 718/104 |
| 2008/0305781 A1 | 12/2008 | Wilson et al. | |
| 2014/0025610 A1* | 1/2014 | Fox | G06F 7/60 706/13 |
| 2015/0339572 A1* | 11/2015 | Achin | G06N 5/02 706/46 |
| 2016/0154660 A1 | 6/2016 | Clark et al. | |
| 2016/0155073 A1 | 6/2016 | Augenstein et al. | |
| 2017/0257289 A1* | 9/2017 | Cui | H04L 43/04 |
| 2017/0315848 A1* | 11/2017 | Kung | G06F 9/5066 |

OTHER PUBLICATIONS

Unknown Author, IBM Knowledge Center—Backfill Scheduling, www.ibm.com/support/knowledgecenter/en/SSETD4_9.1.3/lsf_admin/backfill.html, Feb. 1, 2001 (Year: 2001).*

Islam et al., "Empirical prediction models for adaptive resource provisioning in the cloud", FGCS 28 pp 155-162, Jun. 2011 (Year: 2011).*

Quiroz et al., Towards Atonomic Workload Provisioning for Enterprise Grids and Clouds, IEEE Int. Conf, on Grid Computing, 2009 (Year: 2009).*

Ali et al., "Resource Management Services for a Grid Analysis Environment," Parallel Processing, 2005, ICPP 2005 Workshops, International Conference Workshops on IEEE, 2005.

Andreozzi et al., "Grid ICE: A Monitoring Service for Grid Systems," Future Generation Computer Systems 21.4 (2005): 559-571.

Herodotou et al., "A What-If Engine for Cost-Based Map Reduce Optimization," Bulletin of the Technical Committee on Data Engineering Mar. 2013 vol. 36 No. 1, IEEE.

Ramirez et al., "A Self-Testing Autonomic Job Scheduler," Association for Computing Machinery—Southeast (ACMSE'08)M Auburn, Alabama, Mar. 28-29, 2008.

Rochford, Keith, "Command and Control for Grid Infrastructures," DISS, Trinity College, 2008.

Schad et al., "Runtime Measurements in the Cloud: Oberserving, Analyzing, and Reducing Variance," Proceedings of the VLDB Endowment 3.1-2 (2010): 460-471.

Zanikolas et al., "A Taxonomy of Grid Monitoring Systems," Future Generation Computer Systems 21 (2005) 163-188. Elsevier.

* cited by examiner

COGNITIVE SCHEDULER

TECHNICAL FIELD

The present disclosure generally relates to resource allocation for a job to be executed in a cluster system and, more particularly, to an optimized configuration for a projected amount of resources based on machine learning.

BACKGROUND

A distributed processing system relies on clusters of multiple processing nodes and/or shared memory to provide computing services requested by users and carry workloads of various types. Processing nodes in a clustered system may have different computing power as each processing node may have different computing elements or resources, such as the number of central processing units (CPUs), the amount of memory, and the amount of storage space available. Some processing nodes may be designated for running certain software applications. The computing elements in each processing node, such as CPUs, memory, storage space, or others, may be referred as resources available for executions of jobs submitted by users. Thus, a cluster system may be viewed as a highly dimensional space, or a resource allocation space hereinafter, as each dimension may be represented by a computing element in a processing node. To guarantee computing services without interruption or minimal delay, efficient resource management and scheduling techniques are used, since the amount of available resources is limited. Efficient resource management may involve optimization of a configuration of available resources in the resource allocation space. A configuration may be viewed as a single point in the resource allocation space, which may be further interpreted as a resource allocation map describing the designated amounts of various computing elements in processing nodes available for the execution of a job. Presently, most of distributed computing providers rely on simple resource allocation policies like Best Effort, in which resources are provided if available, else the job is queued. Classical scheduling techniques are deterministic, meaning providing an amount of resources as requested and executing jobs in the order of arrival.

SUMMARY

In the present disclosure, an approach of tuning, which suggests a configuration in the resource allocation space for a job from a learning model that optimizes the job's objective functions (such as minimal execution time or minimal job-queue wait time), may be adopted by a job resource scheduler. The job resource scheduler, including the tuning process, considers the types of jobs and the resource availability in its scheduling decision. The tuning server may include mathematical tuning algorithm (e.g., function minimization) and/or the machine learning methods (e.g., artificial neural network). The tuning server explores the resource allocation space and improves configuration suggested through time progresses with many job executions. The tuning/learning is based on historic data collected from previously executed jobs (job characteristics, resource used, performance measurements) and its tuning/learning mechanism. The output of the tuning server (which is a configuration) then used by the job scheduler to run the job and render guaranteed services for users. The job-associated information is then collected and stored into the historical data for future references.

According to one embodiment of the present disclosure, a method of classifying a plurality of jobs and allocating a plurality of available resources for the jobs is provided. The characteristics and performance data of previously executed jobs may be retrieved and analyzed by a job resource scheduler. The classification of jobs may be based on a similarity of the job characteristics and/or a similarity of historic performance data from previously executed jobs. The result of analysis of job characteristics and performance data from many previously executed jobs may be used to train or update a learning model that projects an amount of resources for execution of a certain type of jobs. A tuning process may further suggest a configuration in the resource allocation space to achieve a set of objective functions, such as minimizing job-queue waiting time and execution time, or maximizing resource utilization. The job resource scheduler may accept the configuration and allocate the projected amount of resources according to the configuration to execute the job in a cluster system.

According to another embodiment of the present disclosure, a method of allocating an amount of available resources in a cluster system is provided. A cluster system management server may analyze a current job in a job queue submitted with a requested amount of resources to a job resource scheduler. The job resource scheduler may have a policy regarding an order of a plurality of jobs in the job queue. The cluster system management server may consult a tuning server and receive a configuration for a projected amount of resources to execute the current job. The projected amount of resources may be suggested by a learning model in the tuning server. The configuration for the projected amount of resources may be suggested by a tuning kernel in the tuning server because of optimization with respect to a set of objective functions. The cluster system management server may allocate the projected amount of resources in the cluster system to execute the current job according to the configuration. The cluster system management server may record a set of job characteristics and performance data associated with the current job in a system log. The learning model and the tuning kernel may be updated by correlating historic data through many executions.

According to another embodiment of the present disclosure, an apparatus is provided. The apparatus may comprise a job resource scheduler configured to allocate a plurality of available resources in a cluster system, and a cluster system configured to execute jobs. The job resource scheduler further comprises: a cluster system management server configured to receive requests for jobs in a job queue, with each job requesting different amounts of resources; a tuning server configured to optimize, by machine learning of previously executed jobs, a set of objective functions for a suggested configuration in the resource allocation space for the execution of a job; a system log configured to store a set of job characteristics and performance data of previously executed jobs. The cluster system may comprise a plurality of cluster nodes.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 is a block diagram of an example flow in which various embodiments in accordance with the present disclosure may be implemented.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, and/or components have been described at a relatively high-level, without detail, in order to avoid unnecessarily obscuring aspects of the present teachings.

The present disclosure generally relates to resource allocation for a job to be executed in a cluster system and, more particularly, to an optimization with respect to a set of objective functions for suggesting a configuration in the resource allocation space based on an approach of learning/tuning process. A job resource scheduler according to various embodiments of the present disclosure may be able to classify a number of jobs submitted for executions in a cluster system according to the job characteristics and performance data recorded during executions. The job resource scheduler may leverage the knowledge of the classification to improve resource utilization by machine learning of workload patterns and allocate resources according to the patterns. The job resource scheduler may utilize learning models and tuning processes to explore a resource allocation space to help quickly move the operation of a particular job to a more optimal operating point. The learning models may be trained using historic performance data of previously executed jobs (e.g., execution time, size of data, and bandwidth utilization) or job characteristics (e.g., users, linked libraries, and applications) for projecting an amount of resources to execute a given job. The tuning process may suggest a configuration by minimizing or maximizing a set of objective functions with consideration of resources available in the resource allocation space.

According to embodiments of the present disclosure, the job resource scheduler may include a job queue, a cluster system management server, a tuning server, and a system log. The cluster system management server may receive a request from the job queue for execution of a job with a requested amount of resources. The cluster system management server may consult with the tuning server for projecting an amount of resources to execute the job based on job characteristics and classification. The tuning server may further suggest a configuration in the resource allocation space with consideration of the amount of available resources. Based on feedback of the tuning server and policies of the job resource scheduler, the cluster system management server may allocate the projected amount of resources for execution of the job in a cluster system according to the suggested configuration. The cluster system management server may also store performance data, job characteristics, and resources used in the runtime configuration in the system log to improve the learning/tuning process performed by the tuning server.

In some embodiments of the present disclosure, the tuning server may be implemented as a piece of software that either runs independently or as a part of the cluster system management server.

Example Flow

Figure 1:
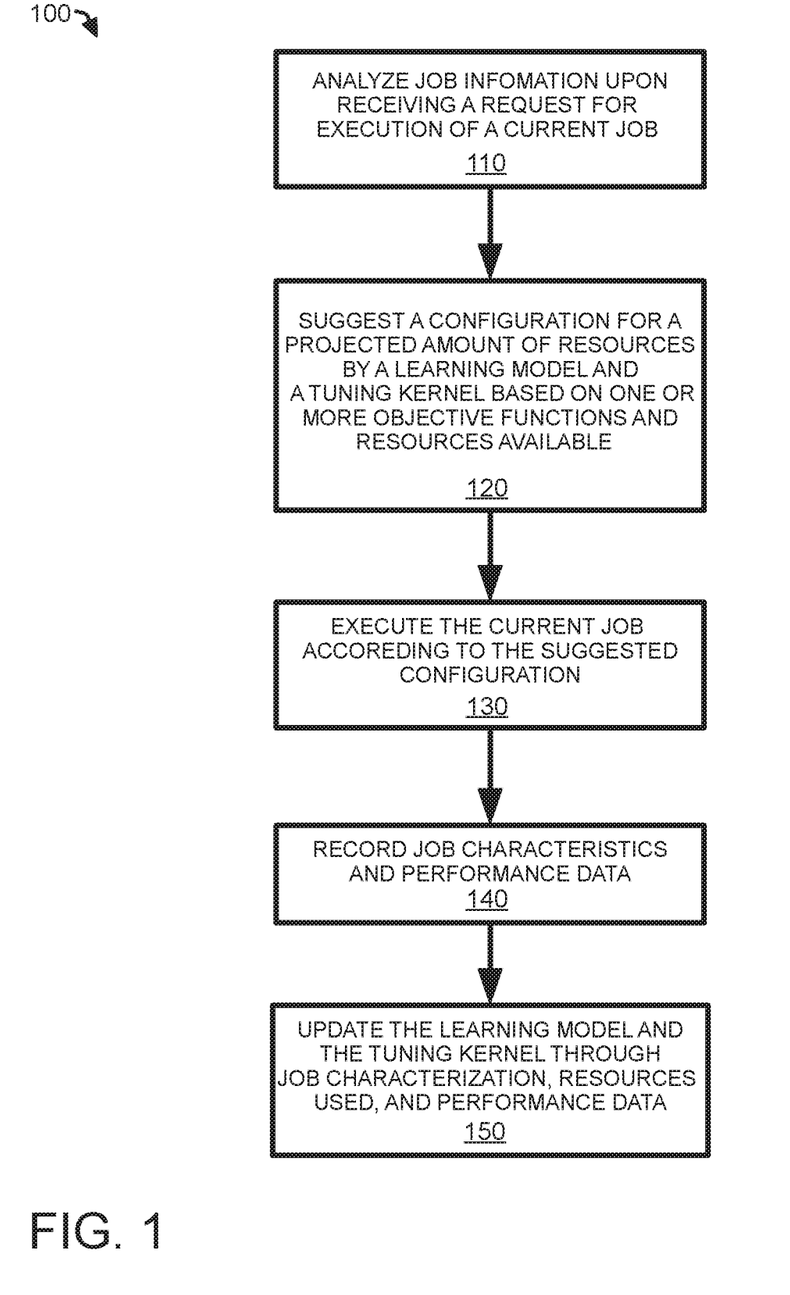

FIG. 1 is a block diagram of an example flow 100 illustrating various embodiments in accordance with the present disclosure. The example flow 100 may include one or more operations, actions, or functions as represented by one or more of blocks 110, 120, 130, 140, and 150. Although illustrated as discrete blocks, various blocks of flow 100 may be divided into additional blocks, combined into fewer blocks, or eliminated, depending on the desired implementation. Example flow 100 may be performed by a special-purpose machine (e.g., apparatus 200 to be described below) that is designed to perform specific tasks and functions pertaining to optimizing configuration for a projected amount of resources based on machine learning in accordance with the present disclosure.

The example flow 100 may represent a flow of allocating available resources for a job submitted for execution with a requested amount of resources. A submitted job may, for example and without limitation, have the following format of commands: {specific-application jobfilename, resource 1 (amount), resource 2 (amount)}. In this example, jobfilename may be a filename of the job to be executed with the specific-application, the job itself may be a piece of codes. Resource 1 may be a type of resource, e.g., memory, and amount may be the number or capacity of the requested resource, e.g., four threads or 16 GB of memory. A job may be submitted with input data or options in the command such as link libraries. Thus, the content of the codes, the requested format of the command, and the input data may be considered as job information, which may suggest the type of the job or its job characteristics, and help understanding of the execution requirements. For instance, if the specific-application is MATLAB or SPICE, then the submitted job is most likely computational intensive, floating-point operative, and involving heavy matrix multiplications. Upon receiving a request for execution of a job, the job information and currently available resources may be received and analyzed. At block 110, the job characteristics may be obtained from the analysis of job information and the type of the job may be classified by the job information or job characteristics such as users, linked libraries, specific-applications, or lengths of codes. For example, user classification may be understood as the same user may repeatedly submit the same type of jobs for execution, whereas linked libraries, in some cases, may indicate the level of computing power required by the job. The length of codes may indicate the required space of memory or required storage of output. At block 120, the requested amount of resources may be replaced with a projected amount of resources based on a model learned from the historic performance data of previously executed jobs bearing a similar type of job characteristics. Furthermore, a tuning kernel optimizes (minimizing or maximizing) one or more objective functions with consideration of resources available in the resource allocation space and suggest a configuration to execute the job. The optimization may also exploit information of historic performance data and resource efficiency of utilized processing nodes. A configuration of resources may be viewed as a resource allocation map or a single point in the highly dimensional resource allocation space, as described previously. An example is provided herein to illustrate the rationale of projecting an amount of resources and suggesting a configuration for the projected amount of resources. Suppose an amount of resources having a level of computing power of 8 CPUs and 32 GB of memory is projected by a learning model that has been trained well through many executed jobs of a similar type. Optimization for that amount of resources within the resource allocation space is aimed for a configuration that could achieve the goals set by the objective functions. For instance, 4 CPUs and 8 GB of memory may be allocated on a cluster node A, with the other 4 CPUs and 24 GB of memory allocated on another cluster node B, since CPUs in cluster node A may have more computing power but cluster node A may not have enough memory space. The cluster node B alone may have enough CPUs and amount of memory for the execution of the job, however, the CPUs in cluster node B may be less powerful and may not satisfy the objective function of minimal execution time if the job is assigned to cluster node B. The one or more objective functions at block 120 may refer to a minimal execution time, maximizing utilization of CPUs, or other performance metrics of the cluster system. At block 130, the job may be executed according to the configuration for the projected amount of resources. At block 140, performance data and runtime job characteristics may be recorded in a system log for references with respect to jobs to be executed in the future. In some embodiments, upon completion of optimization, the amount of currently available resources in the resource allocation space may be updated and examined against the requested amount of resources for the next job in the job queue. At block 150, the learning model and tuning kernel may be updated for a given type job to improve the suggested configuration and the projected amount of resources through many executions by understanding the recorded performance data with respect to job characteristic and resources used during execution.

In some embodiments, the projected amount of resources may be different from the requested amount of resources. For example, if an amount of X threads is requested, the example flow 100 may suggest X+d (or X−d) threads and observe the performance, wherein X and d are positive integers greater than 0 with N greater than d. Based on the performance result, the execution of next job(s) may be carried out with different amount(s) of suggested resources (e.g., different numbers of threads) to build learning models. This may be an iterative process until the learning models are refined through many executed jobs to a level capable of achieving the goals of objective functions.

Example Apparatus

Figure 2:
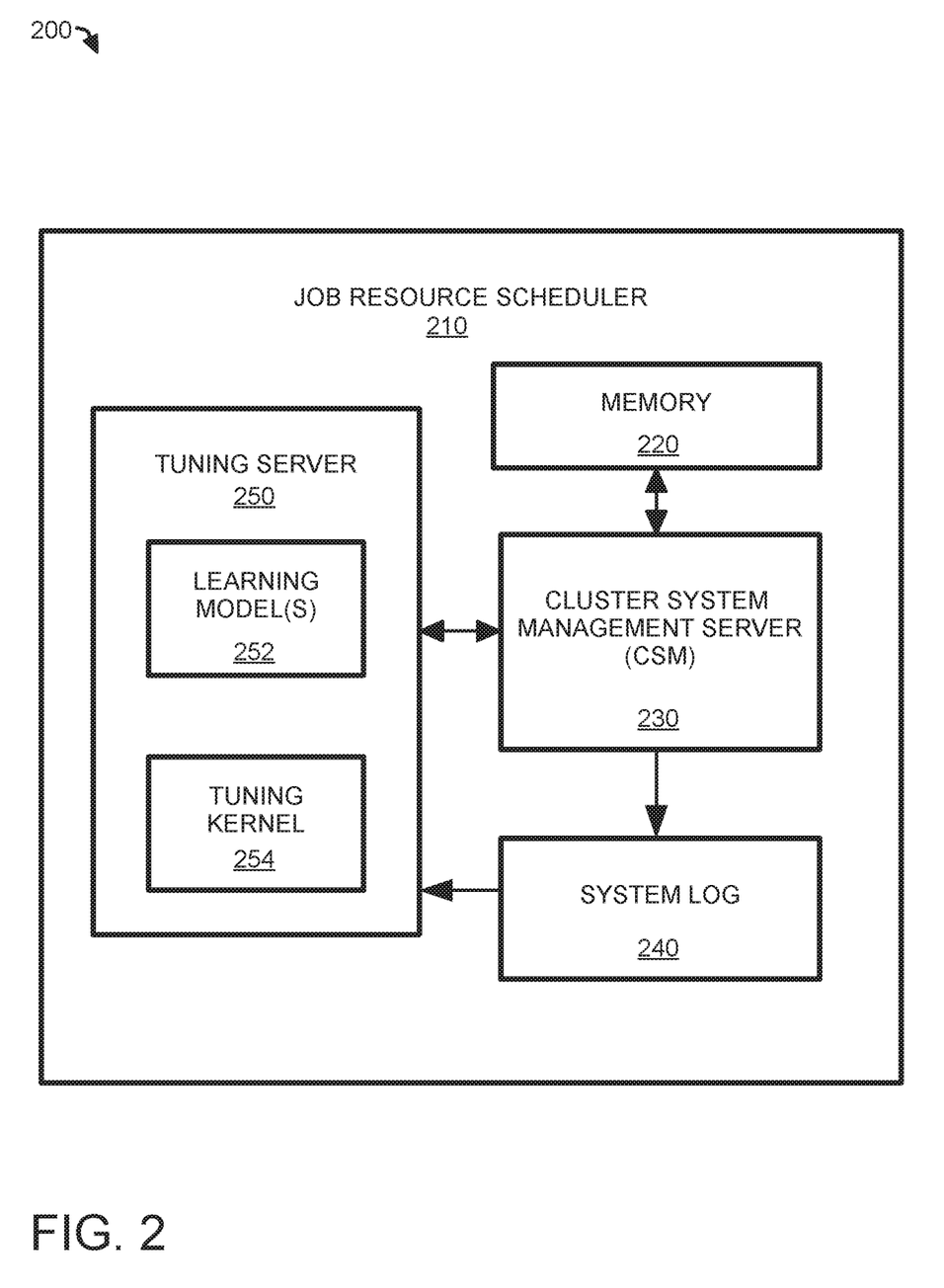
FIG. 2 is a block diagram of an example apparatus of a job resource scheduler in accordance with an exemplary embodiment.

FIG. 2 is a block diagram of an example apparatus 200 provided for scheduling and resource allocation for a plurality of jobs submitted with certain requested amounts of resources, consistent with an exemplary embodiment of the present disclosure. Apparatus 200 may include a job resource scheduler 210, and the job resource scheduler 210 may include a memory 220 for a job queue, a cluster system management (CSM) server 230, a system log 240 and a tuning server 250. The tuning server 250 may include one or more learning models 252 and a tuning kernel 254. In some embodiments, apparatus 200 may be implemented in the form of hardware. In some other embodiments, apparatus 200 may be implemented in the form of partial hardware and partial software. That is, one or more of the components of apparatus 200 shown in FIG. 2 may be implemented in the form of electronic circuits with transistor(s), diode(s), capacitor(s), resistor(s), inductor(s), varactor(s) and/or memristor(s). For instance, in some cases memory 220 as well as CSM server 230 and/or tuning server 250 may be implemented in the form of hardware (electronic circuits). In some embodiments, job resource scheduler 210 may be implemented as one or more processors in the form of one or more integrated-circuit (IC) chips, and may be a special-purpose machine designed to perform specific tasks and functions to effect optimized configuration for a projected amount of resources based on machine learning in accordance with the present disclosure. In other words, job resource scheduler 210 may be implemented with one or more specially-designed electronic circuits performing specific tasks and functions described herein.

Referring to FIG. 2, the job resource scheduler 210 may be operated in a network environment using logical connections to one or more remote computer networks. The job queue 220 may be configured as a computer memory element for storing the order of a number of jobs submitted for execution. The cluster system management server 230 may collect information of available resources in the resource allocation space and deliver the information of available resources and job characteristics of incoming requests to the tuning server 250.

In some embodiments, the tuning server 250, upon receiving the information of available resources and the job characteristics, may retrieve from learning model block 252 a learning model developed for the type(s) of jobs similar to the job of an incoming request to project an amount of resources for execution of the job. The tuning kernel 254 in tuning server 250 may be implemented as mathematical algorithms to perform optimization of one or more objective functions for a suggested configuration in the resource allocation space. The optimization may be based on mathematical algorithms such as, for example and without limitation, Simplex method, iterative methods (Newton, Conjugate Gradient), or Heuristic algorithms.

In some embodiments, the tuning server 250 may utilize information about resource allocation space that may contain resource usage measurements and performance data of previously executed jobs. The information may be used to guide the learning model for an initial suggestion of an amount of resources.

In some embodiments, the cluster system management server 230 may be implemented to accept the suggested configuration for the projected amount of resources from the tuning server 250. The cluster system management server 230 may proceed to allocate the projected amount of resources in the resource allocation space according to the suggested configuration received from the tuning server 250. The cluster system management server 230 may also be configured to monitor and record performance data and runtime job characteristics during the executions of jobs. The recorded information of performance data and runtime job characteristics may be stored in the system log 240.

In some embodiments, the cluster system management server 230 may consider a requested amount of resources of the next job in the job queue 220 with respect to the amount of available resources. The cluster system management server 230 may change the order of jobs for the next job in the event that the requested amount of resources is greater than the amount of available resources.

Example Implementation

Figure 3:
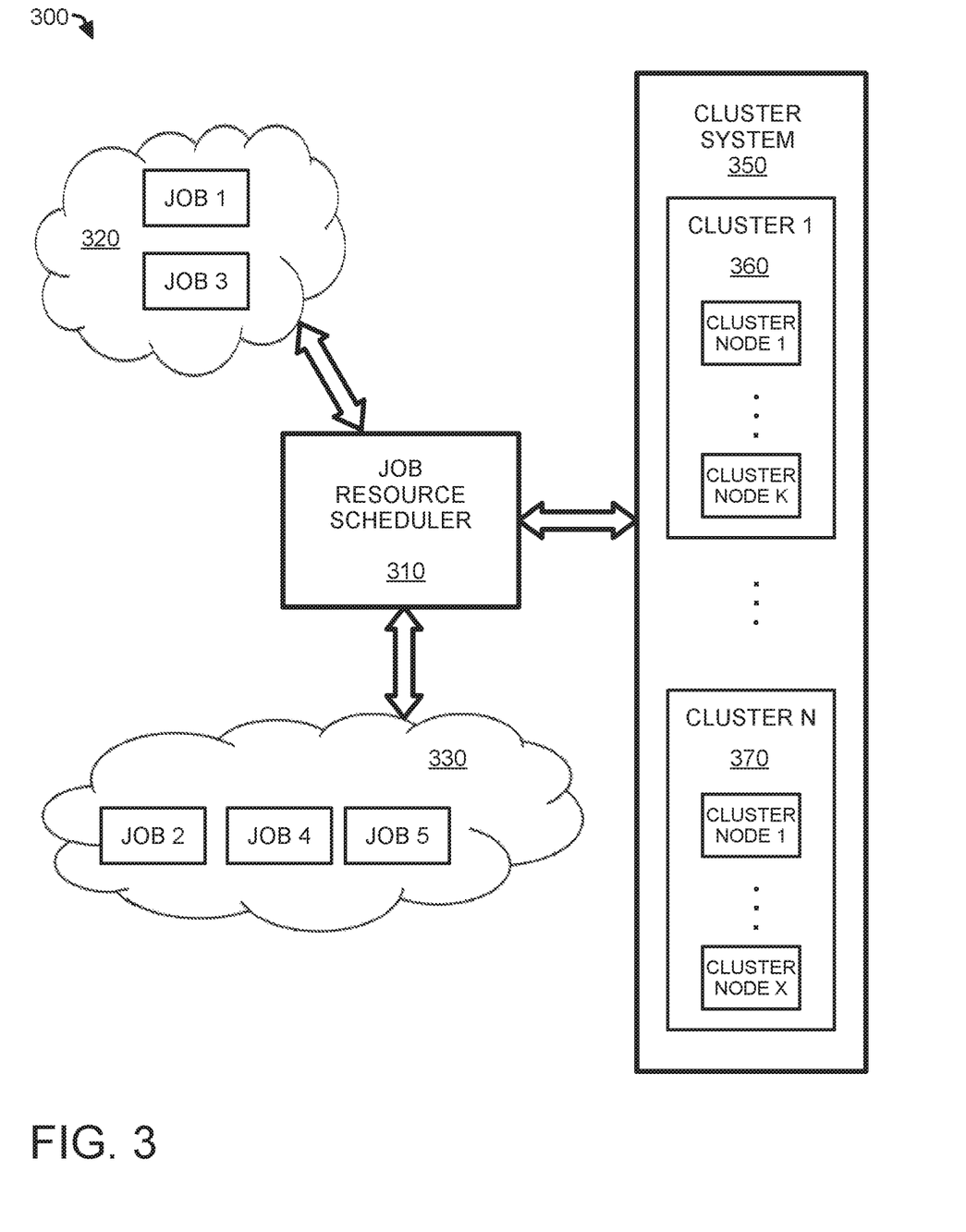
FIG. 3 is a block diagram of an example implementation of a job resource scheduler, consistent with an exemplary embodiment.

FIG. 3 is a block diagram of an example implementation 300 illustrating the process of scheduling a plurality of jobs 320-330 to be executed on a cluster system 350 by a job resources scheduler 310, consistent with an embodiment of the present disclosure. In some embodiments, job resources scheduler 310 may be implemented in the form of hardware. In some other embodiments, job resources scheduler 310 may be implemented in the form of partial hardware and partial software. In alternative embodiments, job resource scheduler 310 may be implemented in the form of software. That is, in some cases, job resources scheduler 310 may be implemented in the form of electronic circuits with transistor(s), diode(s), capacitor(s), resistor(s), inductor(s), varactor(s) and/or memristor(s).

The job resource scheduler 310 may be an example implementation of the job resource scheduler 210. Therefore, detailed description above with respect to the job resource scheduler 210 applies to the job resource scheduler 310. Accordingly, in the interest of brevity, a detailed description of the job resource scheduler 310 is not provided to avoid redundancy.

The blocks 320-330 may represent remote user groups submitting a plurality of jobs to be executed on a cluster system 350. The cluster system 350 may include a plurality of clusters 360-370, i.e., cluster 1 to cluster N with N being a positive integer greater than 1. Each of cluster 1-cluster N may include a plurality of cluster nodes, which may be viewed as a basic computing unit. Each cluster node may include one or more CPUs, an amount of memory, an amount of storage space, and other computing elements.

The job resource scheduler 310 may receive requests from user groups 320-330 to execute jobs on the cluster system 350. The job resource scheduler 310 may allocate a different amount of resources than the requested amount of resources according to the availability of resources in the cluster system 350 and a set of objective functions associated with system performance and resource utilization. The job resource scheduler 310 may be trained from performance data of previously executed jobs to optimize configurations of resources for later jobs to improve resource utilization and system performance.

Example Process

Figure 4:
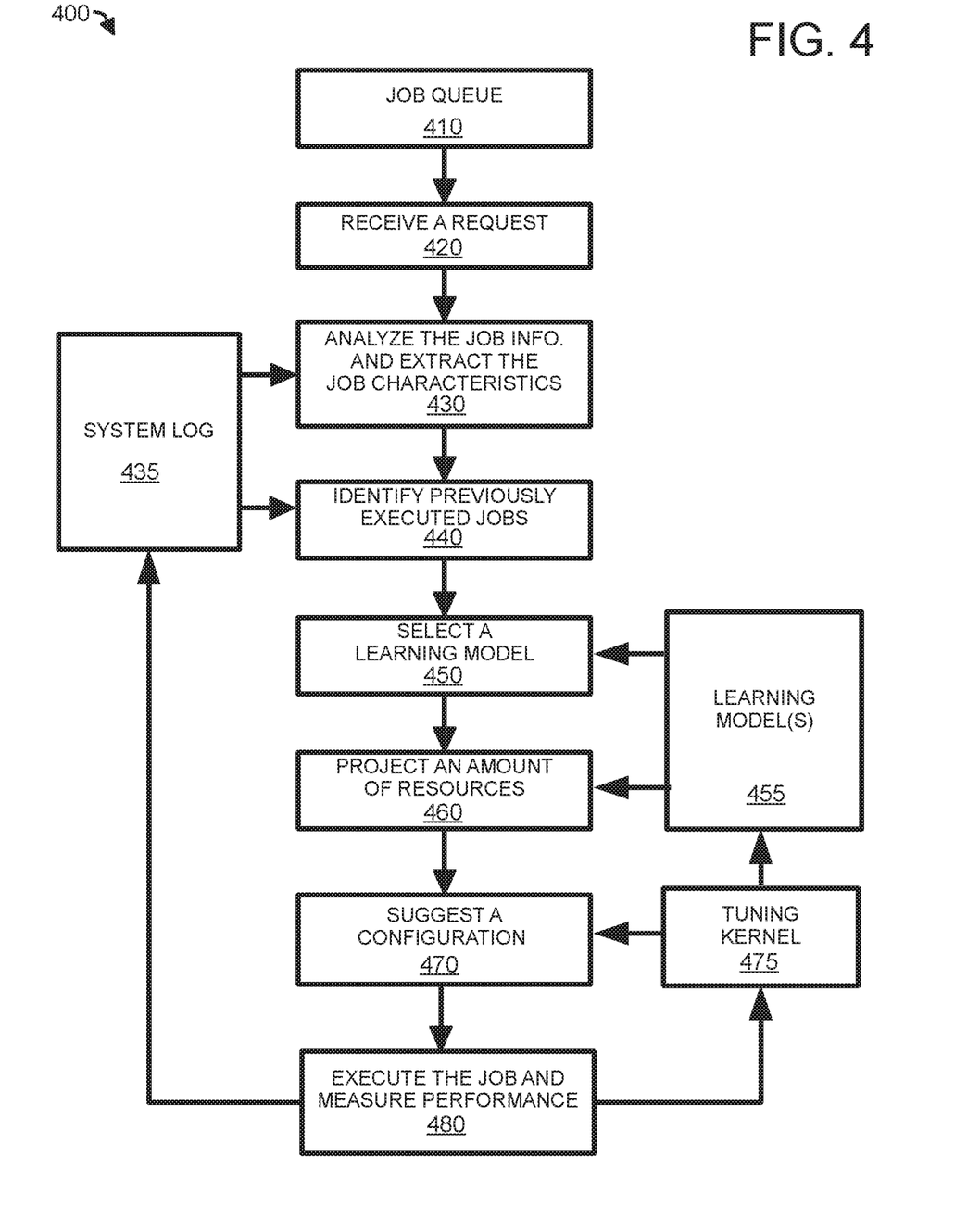
FIG. 4 is a block diagram of an example process of allocating a plurality of available resources for execution of jobs, consistent with an exemplary embodiment.

FIG. 4 depicts an example process 400 in accordance with an embodiment of the present disclosure. Process 400 may include one or more operations, actions, or functions as represented by one or more of blocks 410-480. Although illustrated as discrete blocks, various blocks of process 400 may be divided into additional blocks, combined into fewer blocks, or eliminated, depending on the desired implementation. Process 400 may be performed by a special-purpose machine (e.g., apparatus 200) that is designed to perform specific tasks and functions pertaining to optimizing configuration for a projected amount of resources based on machine learning in accordance with the present disclosure.

FIG. 4 illustrates an example of allocating available resources for a job by a job resource scheduler (e.g., job resource scheduler 210 and job resource scheduler 310). Process 400 may start with 410. At 410, a plurality of jobs may be received in a job queue and the jobs may be ordered according to a local policy such as, for example and without limitation, First In First Out. At 420, a request submitted by the job queue for executing the first job in the job queue may be received by a cluster system management server. At 430, the job may be analyzed and classified according to job information and job characteristics associated with the job. In some embodiments, the classification may be associated with user groups or linked libraries of previously executed jobs stored in a system log 435. At 440, a similar type of previously executed jobs may be identified by a result of the analysis. At 450, a learning model associated with the type identified at 440 may be selected from a database of learning models 455 that may be established from historical data in the system log 435. At 460, an amount of resources may be projected for the execution of the job at request according to the learning model 455. At 470, a configuration for the projected amount of resources in the resource allocation space may be suggested by the tuning kernel 475 performing optimization with respect to one or more objective functions such as maximizing resource utilization and improving system performance. In some embodiments, the optimization may be performed with one or more tuning mathematical algorithms such as Simplex method, iterative methods (Newton, Conjugate Gradient), or Heuristic algorithms. At 475, one or more objective functions may be evaluated and compared to a set of predetermined values. If the one or more objective functions are met, then at the tuning kernel 475 may be updated. In some embodiments, performance data and runtime job characteristics for the job at request may be measured and recorded in the system log 435. At 455, the recorded performance data and runtime job characteristics for the job at request may be used to update the learning model for later jobs.

In some embodiments, the configuration for a projected amount of resources may be a product of an iterative process of optimization. At 470, the (initial) configuration for the projected amount of resources may be adjusted for a final configuration for the projected amount of resources until the one or more objective functions are met with corresponding predetermined values by the optimization process.

In some embodiments, the order of jobs in the job queue may be changed according to the optimization result. At 470, information of available resources after optimization of a current job and the requested amount of resources for a next job may be evaluated. If the requested amount of resources for the next job is greater than the amount of available resources, then another job later in the job queue may be selected as the next job if its requested amount of resources is less than or equal to the amount of available resources.

Example Scenarios

Figure 5:
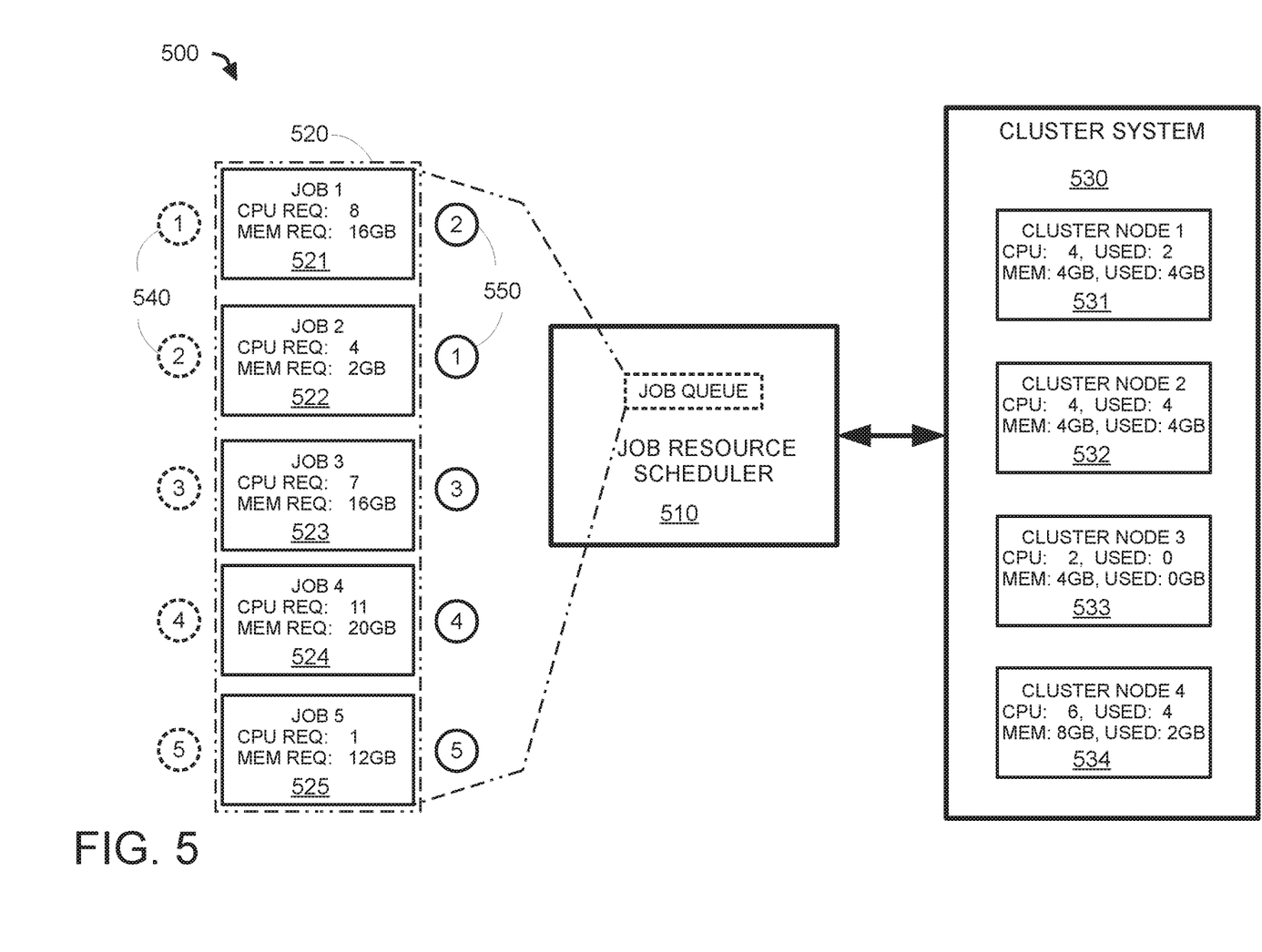
FIG. 5 illustrates an example scenario of modifying the order of jobs in the job queue in accordance with an exemplary embodiment.

FIG. 5 depicts an example scenario 500 of modification of an order of jobs in a job queue upon completion of optimizing a configuration of resources for a job at request, consistent with an embodiment of the present disclosure. Scenario 500 may be performed by a special-purpose machine (e.g., apparatus 200) that is designed to perform specific tasks and functions pertaining to optimizing configuration for a projected amount of resources based on machine learning in accordance with the present disclosure.

A job queue 520 may include a plurality of jobs 521-525, each requesting a different amount of resources. As indicated in 521 and 522, job 1 may request an amount of resources including eight CPUs and 16 GB of memory, whereas job 2 may request another amount of resources including four CPUs and 2 GB of memory. The original order of jobs 521-522 in the job queue may be indicated by 540. The job resource scheduler 510 may evaluate the amount of resources available in a cluster system 530 for a decision of whether or not to accept the original order of jobs in the job queue 520 or not. The cluster system 530 may include cluster nodes 531-534, each having different computing elements. As also indicated in 531, the cluster node 1 may have a resource configuration of four CPUs and 4 GB of memory but the amount available resources include two CPUs and 0 GB of memory. The job resource scheduler 510 may evaluate the amount of available resource of cluster nodes 531-534 and conclude that a total amount of six CPUs and 10 GB of memory are available. Since the first job in the job queue 520 requests a larger amount of resources, i.e., eight CPUs and 16 GB of memory, the jog resource scheduler 510 may identify another job in the job queue that may be executed with no more than six CPUs and 10 GB of memory. As job 2 of 522 requests four CPUs and 2 GB of memory, less than the amount of available resources, the job resource scheduler 510 may decide to move up the order of job 2 to the first place. The new order of jobs in the job queue is indicated by 550, noting that the order of job 1 and job 2 for execution in the cluster system 530 is exchanged.

In some embodiments, job resources scheduler 510 may be implemented in the form of hardware. In some other embodiments, job resources scheduler 510 may be implemented in the form of partial hardware and partial software. In alternative embodiments, job resource scheduler 510 may be implemented in the form of software. That is, in some cases, job resources scheduler 510 may be implemented in the form of electronic circuits with transistor(s), diode(s), capacitor(s), resistor(s), inductor(s), varactor(s) and/or memristor(s).

Figure 6:
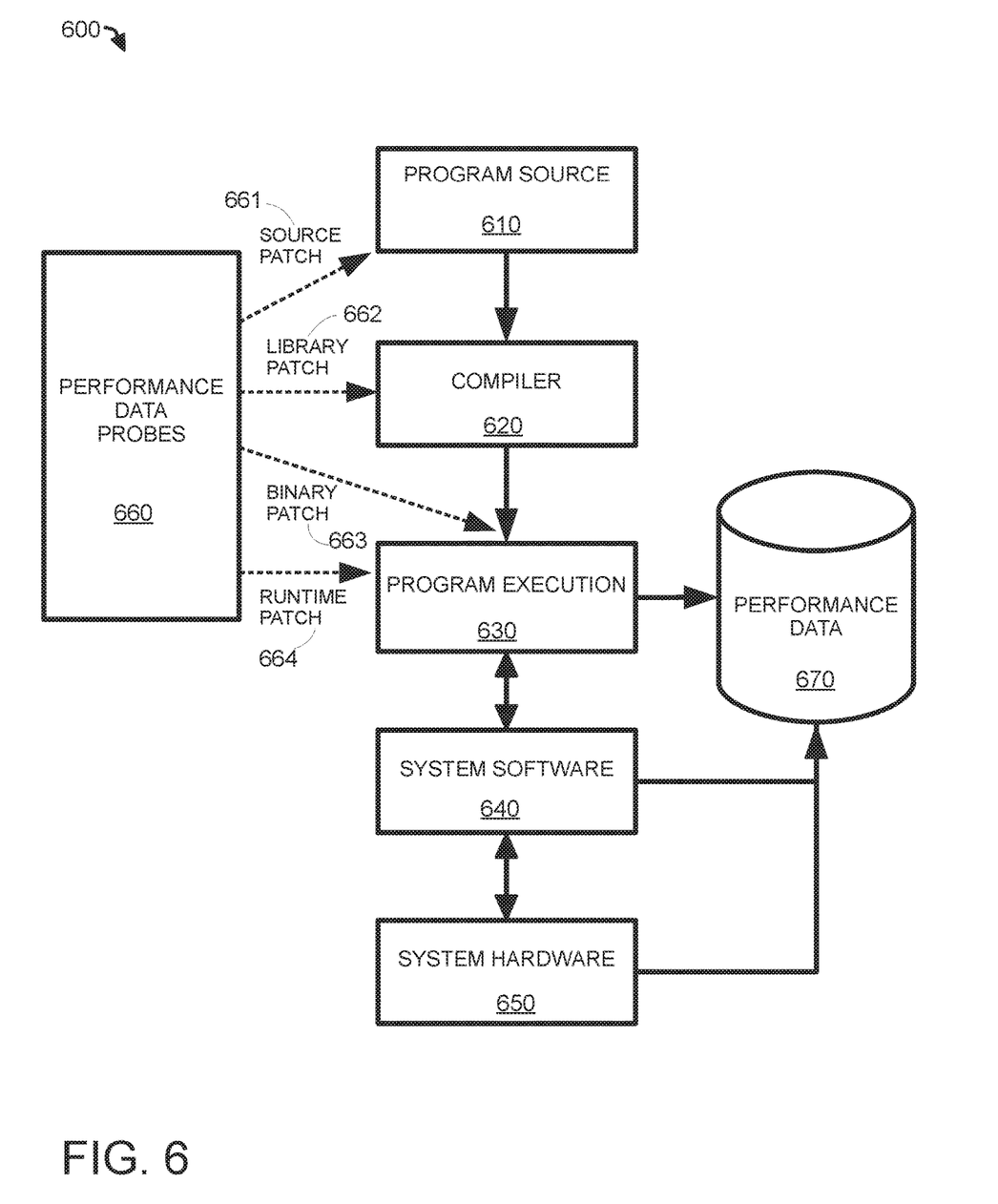
FIG. 6 illustrates an example scenario of recording performance data by a job resource scheduler in accordance with an exemplary embodiment.

FIG. 6 depicts another example scenario 600 of measuring performance data and runtime job characteristics during execution of a job for updating learning models, consistent with an embodiment of the present disclosure. Scenario 600 may be performed by a special-purpose machine (e.g., apparatus 200) that is designed to perform specific tasks and functions pertaining to optimizing configuration for a projected amount of resources based on machine learning in accordance with the present disclosure.

The execution of a job may be viewed as processing a sequence of events as illustrated by 610-630. The sequence of events from 610-630 may be referred as an execution stack of the job. At 610, program source of the job may be received and parsed. At 620, program source may be compiled and linked to the needed libraries. At 630, the job may be executed. The execution stack may be run on top of system software 640 and system hardware 650. The performance data probes 660 may insert patches in the execution stack for monitoring and measuring the performance data and runtime job characteristics as indicated by source patch 661, library patch 662, binary patch 623, and runtime patch 624. The patches 621-624 may be implemented such that the measurement results may be collected by system software 640 and/or system hardware 650. The functionality of performance data probes 660 may be implemented as part of cluster system management server, and performance data block 670 may be implemented as part of the system log as described in the previous apparatus section.

Example Process

Figure 7:
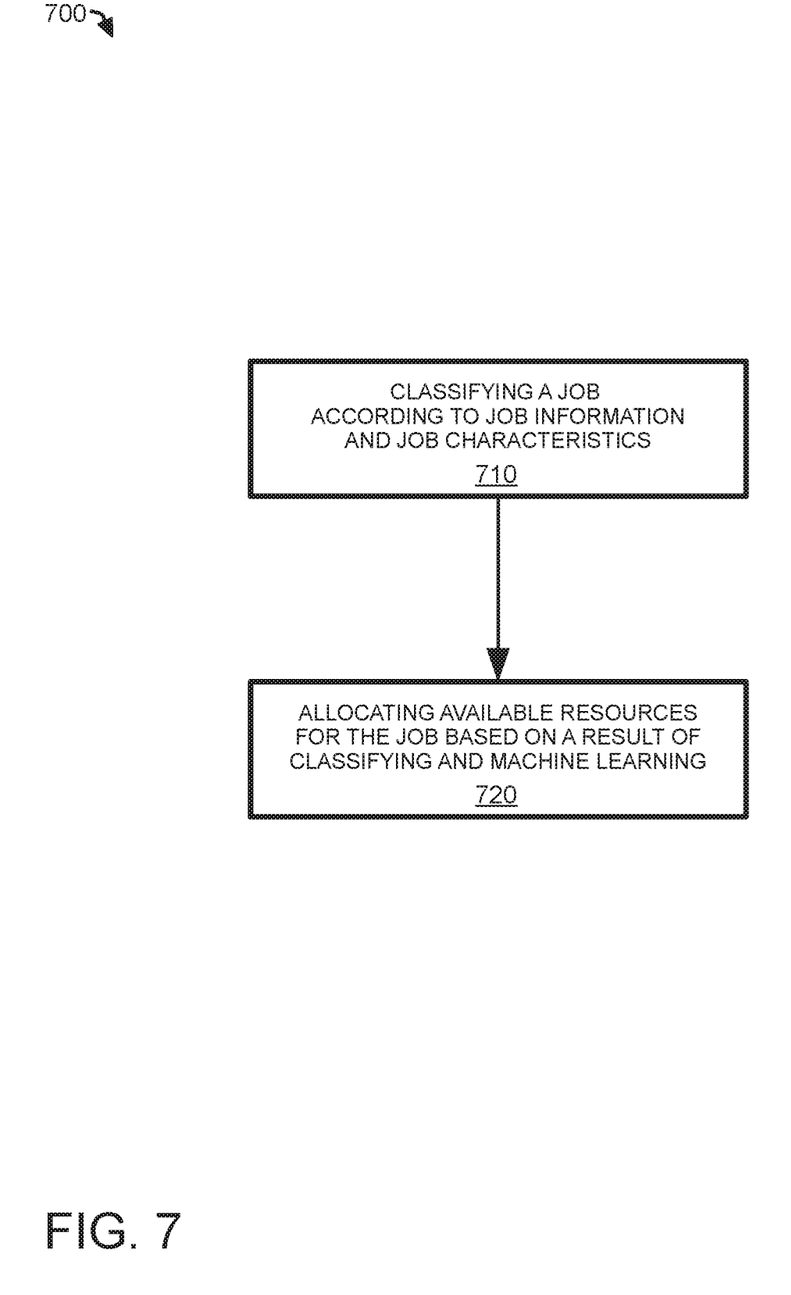
FIG. 7 illustrates an example process that may generate optimized configurations for the suggested amount of resources for execution of jobs.

FIG. 7 depicts an example process 700 of classifying a job and allocating an amount of available resources for the jobs. Process 700 may be performed by a special-purpose machine (e.g., apparatus 200) that is designed to perform specific tasks and functions pertaining to optimizing configuration for a projected amount of resources based on machine learning in accordance with the present disclosure. Process 700 may include one or more operations, actions, or functions as represented by one or more of blocks 710, 711, 712, 720, 721, 722, and 723. Although illustrated as discrete blocks, various blocks of process 700 may be divided into additional blocks, combined into fewer blocks, or eliminated, depending on the desired implementation. Process 700 may be implemented by apparatus 200 and any variations and/or derivatives thereof. Process 700 may be an example implementation of process 400, whether partially or completely. For illustrative purposes and without limitation, process 700 is described below in the context of apparatus 200. Process 700 may begin at block 710.

At 710, process 700 may involve cluster system management server 230 of apparatus 200 classifying a job according to job characteristics associated with one or more jobs of previously executed jobs. The job information may be received from the job queue 220. Process 700 may proceed from 710 to 720.

In some embodiments, in classifying a job according to the job characteristics, process 700 may involve cluster system management server 230 retrieving the job characteristics from job information and performance data associated with the job from the system log 240.

Moreover, in classifying a job according to job characteristics, process 700 may involve cluster system management server 230 identifying one or more jobs of previously executed jobs based on a similarity of the job characteristics.

At 720, process 700 may involve cluster system management server 230 of apparatus 200 allocating an amount of available resources to the job according to a result of classifying and machine learning.

In some embodiments, in allocating an amount of available resources for the job based on machine learning, process 700 may involve tuning server 240 analyzing the historic data associated with one or more jobs of the previously executed jobs.

Moreover, in allocating an amount of available resources for the job based on machine learning, process 700 may involve tuning server 240 updating the learning models 252 associated with the job.

In some embodiments, in allocating an amount of available resources for the job, process 700 may involve the learning model 252 projecting an amount of resources.

Moreover, in allocating an amount of available resources for the jobs, process 700 may involve the tuning kernel 254 suggesting a configuration for the projected amount of resources in the resource allocation space for the job.

Alternatively or additionally, in allocating a plurality of amounts of available resources for the jobs, process 700 may involve cluster system management server 230 allocating the projected amount of resources in the resource allocation space according to the suggested configuration for the job.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of the present teaching. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Additional Notes

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   classifying, by a job resource scheduler, a first job in a job queue comprising a plurality of jobs, the first job having a requested amount of resources, according to a set of job characteristics associated with one or more jobs of a plurality of previously executed jobs, the classifying comprising:
   receiving job information of the job;
   retrieving the job characteristics from the job information; and
   identifying the one or more jobs of the previously executed jobs based on a similarity of the job characteristics;

projecting, by the job resource scheduler, an amount of resources based on a result of classifying and correlating the set of job characteristics with a learning model generated by machine learning, the machine learning comprising:
  analyzing performance data associated with a respective set of job characteristics of the one or more jobs of the previously executed jobs; and
  updating a learning model associated with the one or more jobs of the previously executed jobs according to a result of the analyzing;
suggesting a configuration for the projected amount of resources based on an amount of available resources in a cluster system by a tuning kernel of an optimization with respect to a set of objective functions;
allocating, by the job resource scheduler, the projected amount of resources in the cluster system for execution of the first job based on the suggested configuration;
updating an amount of currently available resources after the allocating;
in response to allocating the projected amount of resources in the cluster system, determining, for a next job in the job queue, whether a requested amount of resources of the next job is greater than an updated available amount of resources, moving another job later in the job queue to the front of the job queue if the another job's requested amount of resources is less than or equal to the updated amount of available resources; and
in response to the job in the front of the job queue having requested amount of resources less than or equal to the updated amount of available resources, classifying, projecting, suggesting, and allocating the job in the front of the job queue.

2. The method of claim 1, wherein the classifying of the job according to the job characteristics associated with the one or more jobs of the previously executed jobs comprises:
  receiving job information of the job;
  retrieving the job characteristics from job information; and
  identifying the one or more jobs of the previously executed jobs based on a similarity of the job characteristics.

3. The method of claim 1, wherein:
suggesting the configuration for the amount of resources in the cluster system by a tuning kernel is a result of an optimization with respect to a set of objective functions.

4. A method of scheduling a current job for execution in a cluster system by a job resource scheduler, comprising:
  analyzing, by a cluster system management server, the current job in a job queue comprising a plurality of jobs, the current job being submitted with a requested amount of resources to the job resource scheduler, wherein the job resource scheduler has a policy regarding an order of the plurality of jobs in the job queue;
  classifying, by the job resource scheduler, the current job in a job queue comprising a plurality of jobs, the current job having a requested amount of resources, according to a set of job characteristics associated with one or more jobs of a plurality of previously executed jobs, the classifying comprising:
    receiving job information associated with the current job;
    extracting the job characteristics of the current job from the system log based on a similarity of job information; and
    classifying the current job by identifying the one or more jobs of the previously executed jobs based on a similarity of the job characteristics;
  projecting, by the job resource scheduler, an amount of resources based on a result of classifying and correlating the set of job characteristics with a learning model generated by machine learning, the machine learning comprising:
    analyzing performance data associated with a respective set of job characteristics of the one or more jobs of the previously executed jobs;
    recording, by the cluster system management server, the configuration, a set of job characteristics, and performance data associated with the current job in a system log; and
    updating, by the cluster system management server, the learning model and the tuning kernel based on recorded historic data;
  suggesting a configuration for the projected amount of resources based on an amount of available resources in a cluster system by a tuning kernel of an optimization with respect to a set of objective functions the configuration for a projected amount of resources in the cluster system suggested by a learning model and a tuning kernel in the tuning server based on at least one of:
    minimizing a job-queue waiting time and execution time; or
    maximizing the resource utilization;
  allocating, by the job resource scheduler, the projected amount of resources in the cluster system for execution of the current job based on the configuration;
  updating an amount of currently available resources after the allocating;
  in response to allocating the projected amount of resources in the cluster system, determining, for a next job in the job queue, whether a requested amount of resources of the next job is greater than an updated available amount of resources, moving another job later in the job queue to the front of the job queue if the another job's requested amount of resources is less than or equal to the updated amount of available resources; and
  in response to the job in the front of the job queue having requested amount of resources less than or equal to the updated amount of available resources, classifying, projecting, suggesting, and allocating the job in the front of the job queue.

5. The method of claim 4, wherein the analyzing of the current job comprises:
  receiving a request for execution of the current job from the job resource scheduler; and
  collecting information describing availability of resources for the current job.

6. The method of claim 4, further comprising:
  receiving, by the tuning server from the cluster system management server, information describing availability of resources and information describing the job characteristics associated with the current job;
  identifying, by the tuning server from the system log, a plurality of previously executed jobs based on a result of analyzing of the current job;
  retrieving, by the tuning server from the system log, performance data of the previously executed jobs; and
  selecting, by the tuning server, a learning model associated with the previously executed jobs from a plurality of learning models.

7. The method of claim 4, further comprising:
suggesting the projected amount of resources by the learning model based on performance data associated with the previously executed jobs in the system log.

8. The method of claim 4,
wherein the optimization with respect to the set of objective functions comprises minimizing or maximizing the objective functions with consideration of resources available in the cluster system.

9. The method of claim 4, wherein the updating of the learning model and the tuning kernel comprises:
incorporating the performance data and the job characteristics into one or more mathematical models and one or more tuning algorithms respectively.

10. The method of claim 4, further comprising:
applying a plurality of software patches in an execution deck of the current job to measure the performance data.

11. An apparatus, comprising:
a job resource scheduler capable of classifying a plurality of jobs submitted for execution and allocating a plurality of amounts of available resources, the job resource scheduler comprising:
   a memory capable of storing a job queue of the plurality of jobs;
   a system log capable of storing the configuration, a set of job characteristics, and performance data associated with the current job; and
   a cluster system management server capable of:
      receiving a request for execution of a current job in a job queue comprising a plurality of jobs, the current job in the job queue having a requested amount of resources;
      classifying the current job according to a set of job characteristics associated with one or more jobs of a plurality of previously executed jobs, the classifying comprising:
         receiving job information associated with the current job from the system log;
         extracting the job characteristics of the current job based on a similarity of job information; and
         classifying the current job by identifying the one or more jobs of the previously executed jobs based on a similarity of the job characteristics;
   a tuning server capable of:
      projecting an amount of resources based on a result of the classifying, and correlating the set of job characteristics with a learning model generated by machine learning, the machine learning comprising:
         analyzing performance data associated with a respective set of job characteristics of one or more jobs of the previously executed jobs; and
         updating the learning model associated with the one or more jobs of the previously executed jobs according to a result of the analyzing;
      suggesting a configuration for the projected amount of resources for execution of the current job based on an amount of available resources in a cluster system by a tuning kernel of an optimization utilizing one or more mathematical algorithms to optimize a set of objective functions for suggesting a configuration;
      wherein the configuration for a projected amount of resources in the cluster system is suggested by a learning model and a tuning kernel in the tuning server
      wherein the cluster system management server is further capable of:
         allocating the projected amount of resources in the cluster system for execution of the job according to the configuration;
         updating an amount of currently available resources after the allocating;
         in response to allocating the projected amount of resources, determining, for a next job in the job queue, whether a requested amount of resources of the next job is greater than an updated available amount of resources, moving another job later in the job queue to the front of the job queue if the another job's requested amount of resources is less than or equal to the updated amount of available resources;
         in response to the job in the front of the job queue having requested amount of resources less than or equal to the updated amount of available resources, classifying, projecting, suggesting, and allocating the job in the front of the job queue; and
   a cluster system capable of executing the current job, the cluster system comprising a plurality of cluster nodes.

12. The apparatus of claim 11, wherein the cluster system management server is further capable of performing operations comprising:
collecting information describing availability of resources for the current job;
receiving the configuration for the projected amount of resources; and
executing the current job in the cluster system according to the configuration for the projected amount of resources.

13. The apparatus of claim 11, wherein the cluster system management server is further capable of applying a plurality of software patches in an execution deck of the current job to measure the performance data.

14. The apparatus of claim 11, wherein the cluster system management server is further capable of recording the configuration, the job characteristics, and performance data associated with the current job in the system log.

15. The apparatus of claim 11, wherein the tuning server comprises:
a plurality of learning models capable of projecting a plurality of amounts of resources based on performance data associated with a plurality of previously executed jobs.

16. The apparatus of claim 15, wherein the tuning server is further capable of performing operations comprising:
receiving information describing availability of resources and information describing a set of job characteristics associated with a current job;
identifying the previously executed jobs based on a similarity of the job characteristics associated with the current job;
selecting a learning model associated with the previously executed jobs from the plurality of learning models;
projecting the amount of resources by the selected learning model based on performance data; and
suggesting the configuration for the projected amount of resources by the tuning kernel performing optimization with respect to the objective functions.

17. The apparatus of claim 16, wherein the tuning server is further capable of updating the learning models and the tuning kernel by incorporating the performance data and the job characteristics of the current job into one or more mathematical models and one or more tuning algorithms respectively.

* * * * *